INVENTOR.
HELMAR SCHLEIN
BY
ATTORNEY

*INVENTOR.*
HELMAR SCHLEIN
*BY*
[signature]
ATTORNEY

*INVENTOR.*
HELMAR SCHLEIN

*BY* [signature]

ATTORNEY

March 14, 1967 H. SCHLEIN 3,309,507

OPTIMAL CONTROLLER COMPUTER

Filed Jan. 17, 1963 9 Sheets-Sheet 4

*INVENTOR.*
HELMAR SCHLEIN
*BY*

ATTORNEY

INVENTOR.
HELMAR SCHLEIN
BY
[signature]
ATTORNEY

INVENTOR.
HELMAR SCHLEIN
BY
ATTORNEY

INVENTOR.
HELMAR SCHLEIN
BY
[signature]
ATTORNEY

INVENTOR.
HELMAR SCHLEIN
BY
ATTORNEY

INVENTOR.
HELMAR SCHLEIN
BY
[signature]
ATTORNEY

3,309,507
OPTIMAL CONTROLLER COMPUTER

Helmar Schlein, Reseda, Calif., assignor to North American Aviation, Inc.

Filed Jan. 17, 1963, Ser. No. 252,107
13 Claims. (Cl. 235—150.1)

The present invention relates to a method and apparatus for controlling a system and more particularly to a computer to optimize a dependent variable with respect to an independent variable of a system.

The prior art controllers of this type generally utilize a control means which measures an output quantity and searches for variations in the input to maintain the input near the value where maximum output is attained. Such controllers have such disadvantages as: continuously hunting for the maximum, or minimum moving parts which result in operation changing with environment or time, and the use of predicting or anticipating circuits.

The computer of the present invention seeks the optimum by varying the independent variable and obtaining its first differential. The magnitude and sense of the differential of the dependent variable are utilized to control the independent variable in a manner to make the differential of the dependent variable with respect to the independent variable go to zero. The ratio of the dependent variable with respect to independent variable or the reciprocal of this ratio may then be obtained and monitored. As long as this ratio remains essentially constant, no change is fade in the independent variable. Analog schemes are utilized for some of the computer functions while others employ digital or pulse techniques, but neither static memory units nor predicting or anticipating circuits nor other extraneous signal sources or particular externally generated waveforms are utilized, thereby adapting the computer to control functions of more than two variables. The possibility of continuous hunting is eliminated, since no change is made in the independent variable after an optimum has been reached. At this time the ratio of two of the variables is monitored for changes.

Therefore, it is the primary object of the present invention to provide a low-cost compact controller which is capable of controlling a system to maintain the optimum condition of operation of that system.

Another object of the present invention is to provide a computer for determining and indicating the optimum relationship between an independent and a dependent variable.

Another object of the present invention is to provide a control computer system which monitors the operation of a process and automatically brings the process variables into optimum relationship.

Another object of the present invention is to provide a non-linear type controller which maintains optimal conditions without continuous hunting.

Another object of the present invention is to provide an optimal control computer in which the first differential of a dependent variable is taken with respect to an independent variable and when that differential is zero the output is monitored by periodically calculating the ratio of the independent variable with respect to the dependent variables in arbitrary units.

A still further object of the present invention is to provide an optimal control computer for determining the optimum function of two or more variables even though the curve for the function is unknown. The fact that such a relationship exists, i.e. the form of the curve must be known and also the function must be single valued.

These and other objects and advantages of the present invention will be more apparent from the following detailed description and drawings made a part hereof, in which.

Figure 5A:
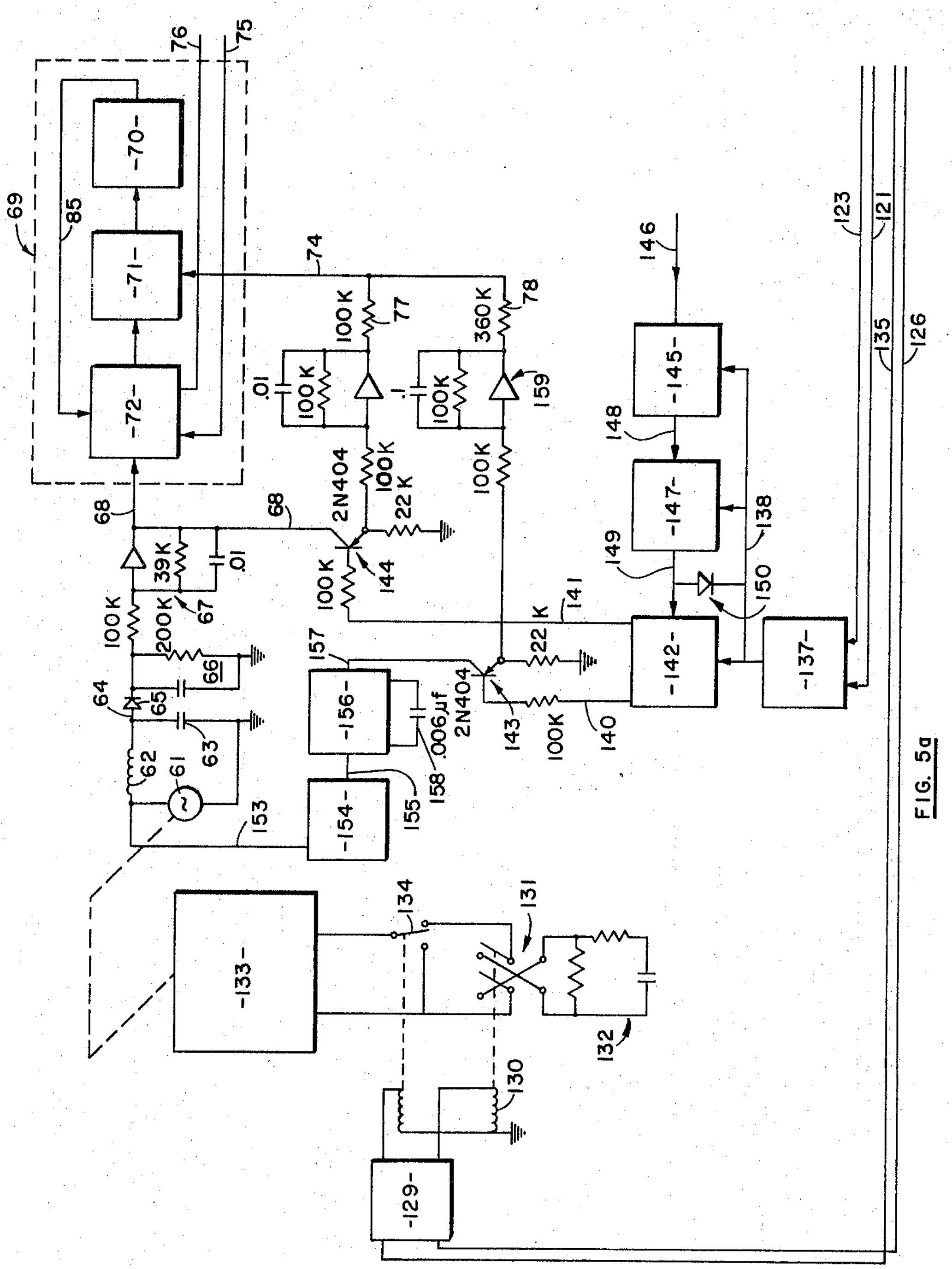
Figure 6:
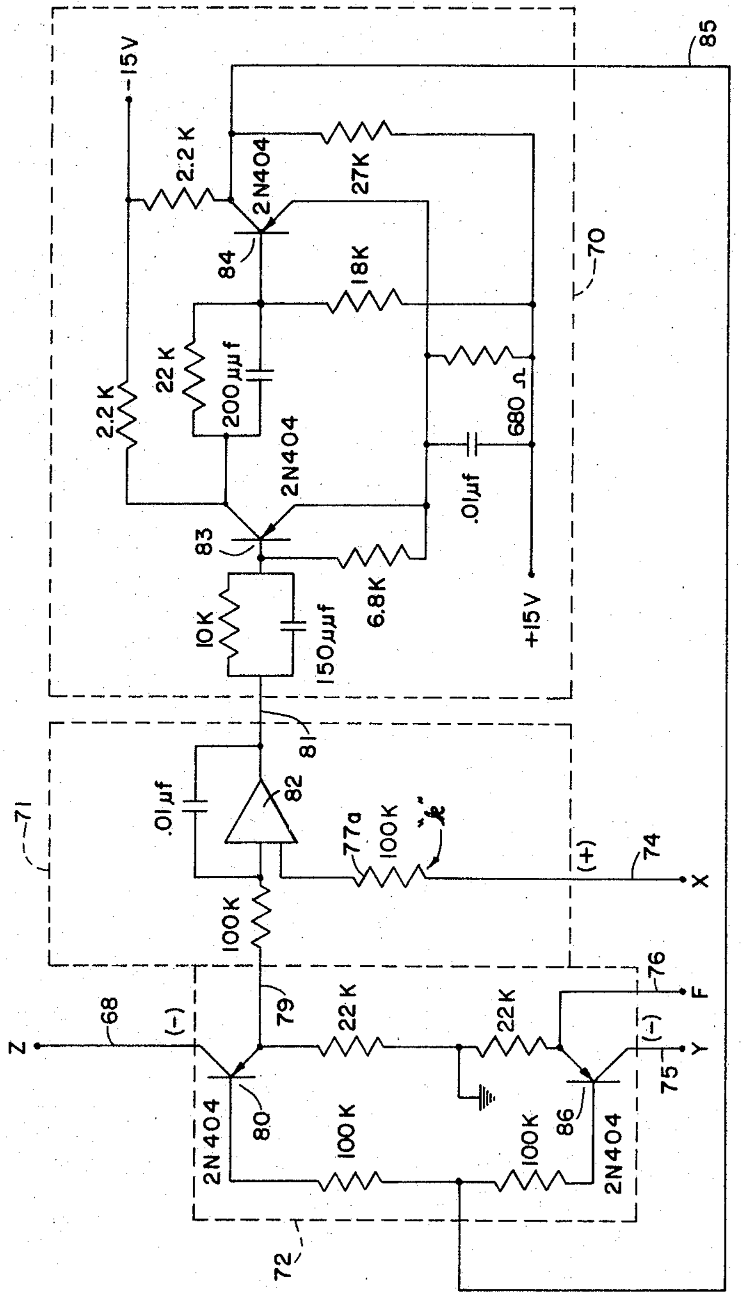
Figure 7:
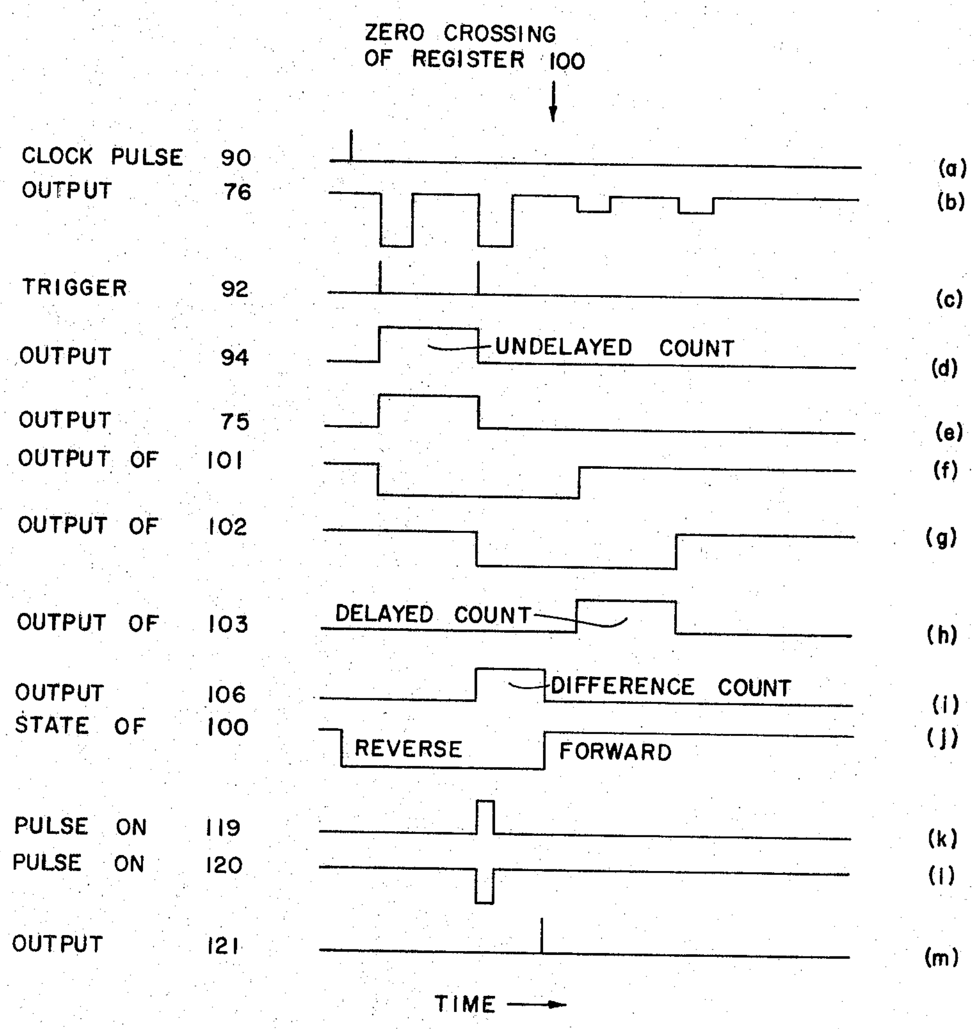
Figure 8:
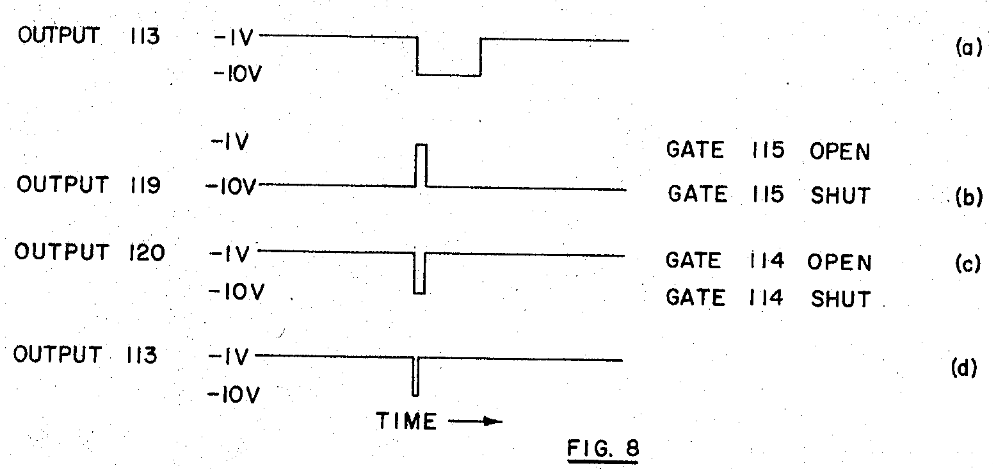
Figure 9:
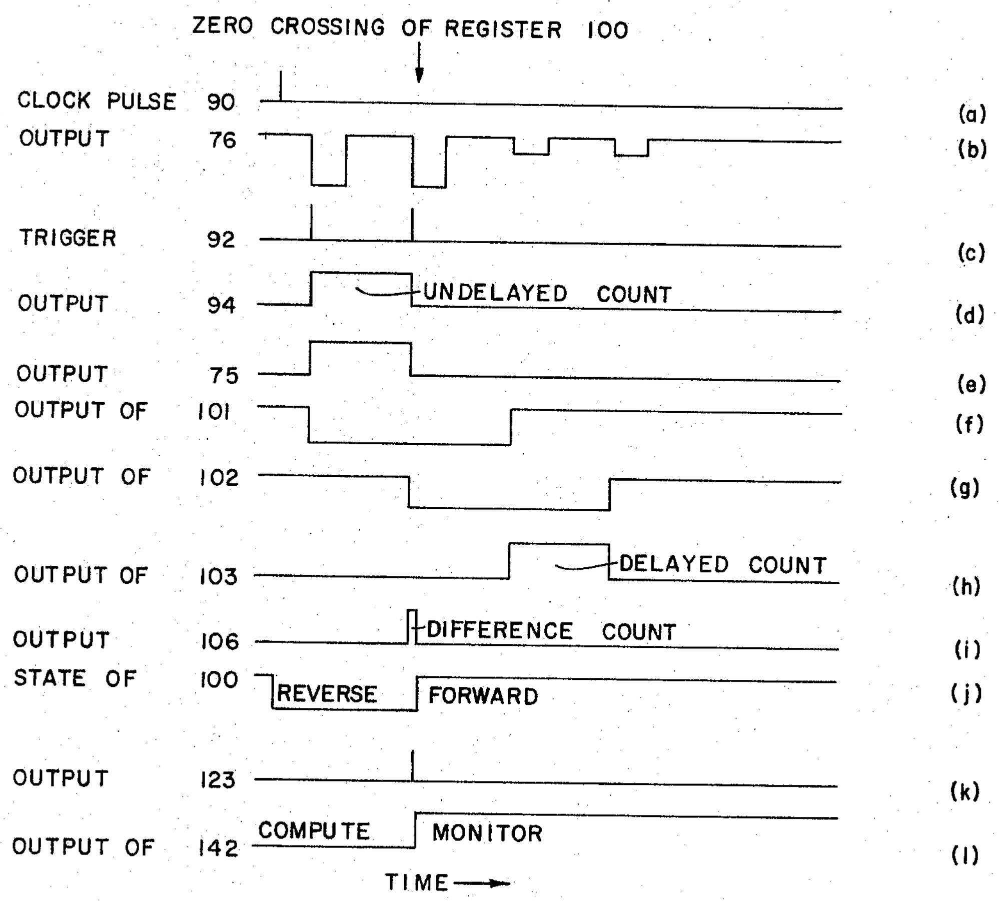
Figure 10:
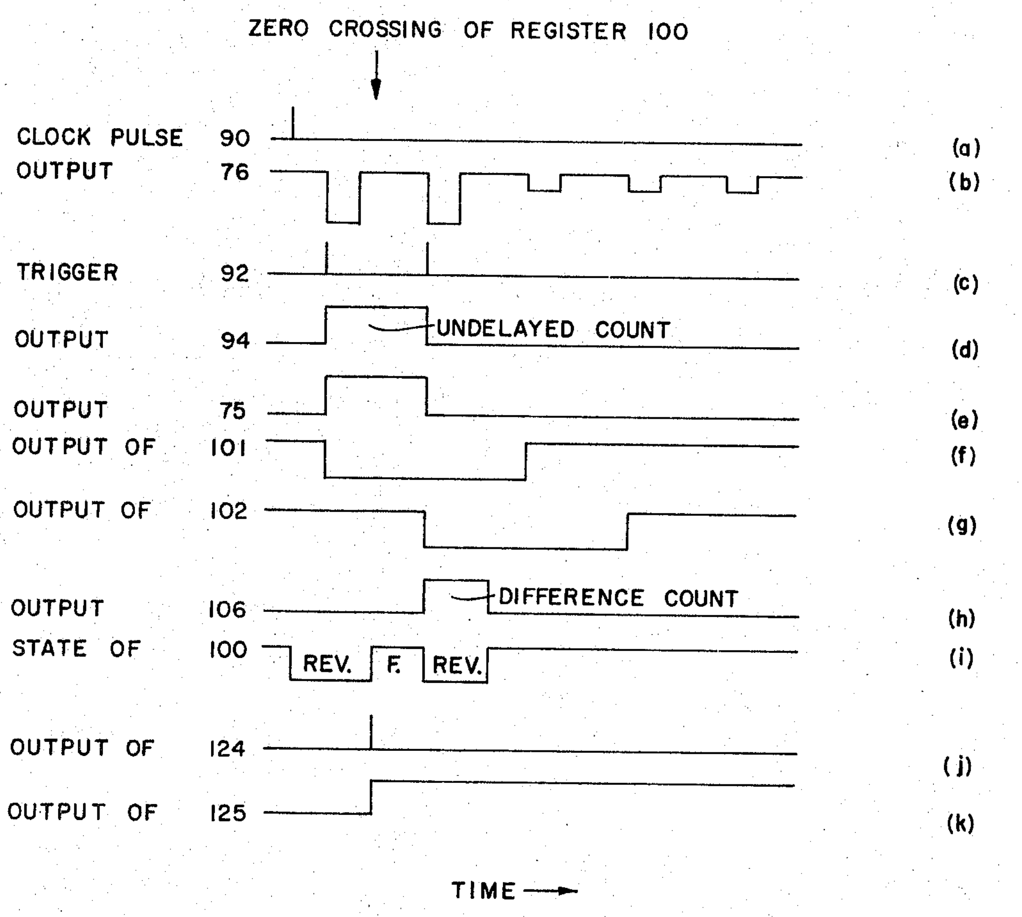
Figure 11:
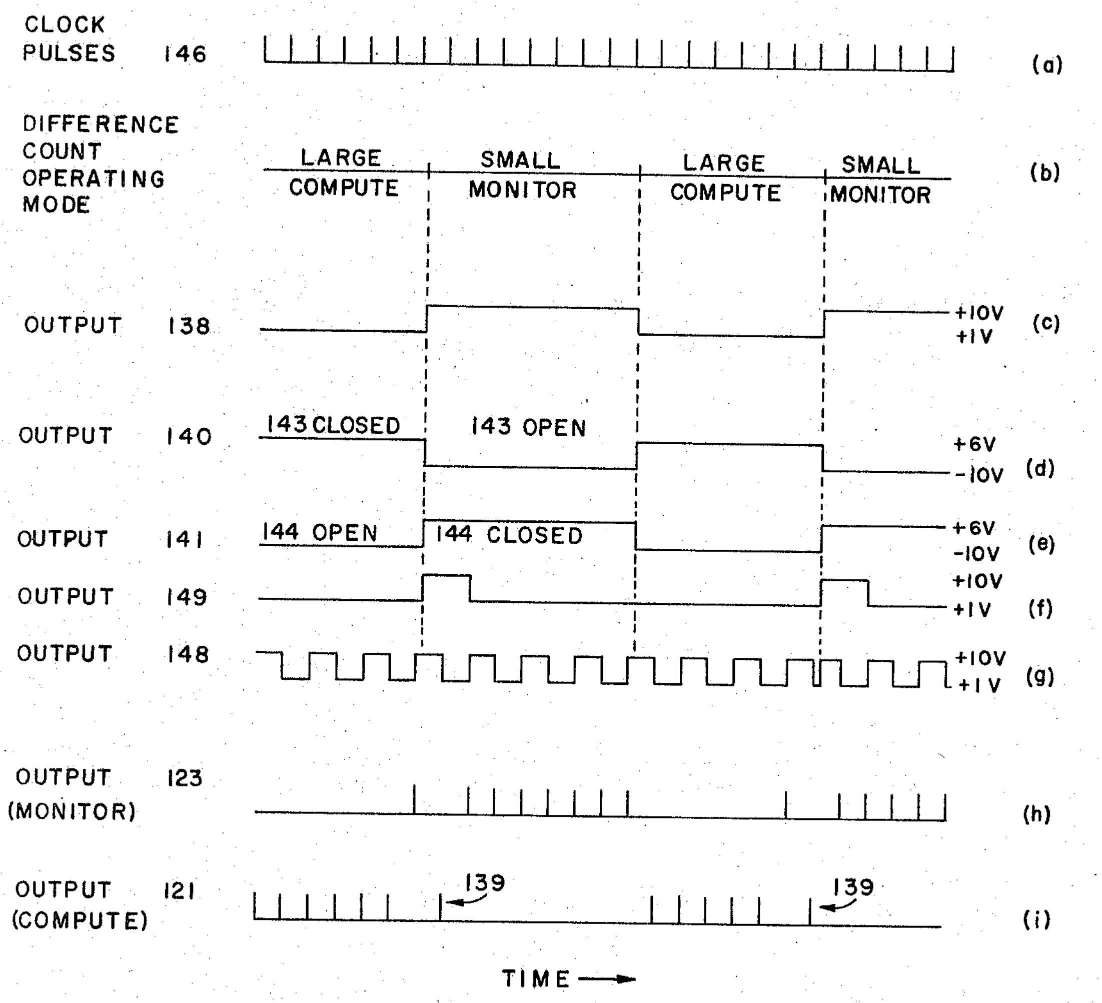

FIGS. 5*a* and *b*, are circuit diagrams of the preferred embodiment of the present invention;

FIG. 6 is a detailed circuit diagram of a portion of the circuit of the preferred embodiment of the present invention; and FIG. 7 is a diagram of the relationship between outputs of various elements of the preferred embodiment when the operating point is moving toward maximum;

FIG. 8 is a diagram of the relationship of outputs of elements of the preferred embodiment upon change from computer mode to monitor mode of operation;

FIG. 9 is a diagram similar to FIG. 7 but for the case of a small difference count;

FIG. 10 is a diagram similar to FIG. 7 for the case when the operating point is moving away from the optimum point;

FIG. 11 is a diagram similar to FIG. 10 explaining the operation of the monitor or compute selection.

Figure 1:
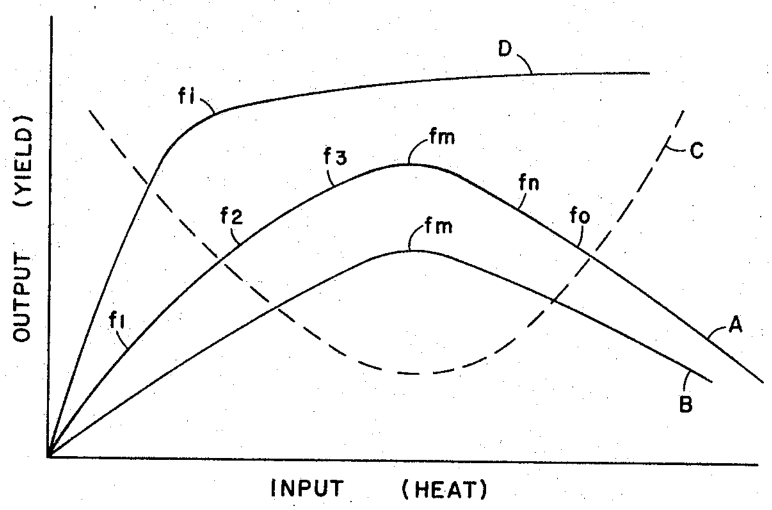
FIG. 1 is a graph of the two variables of an illustrative system.
Figure 2:
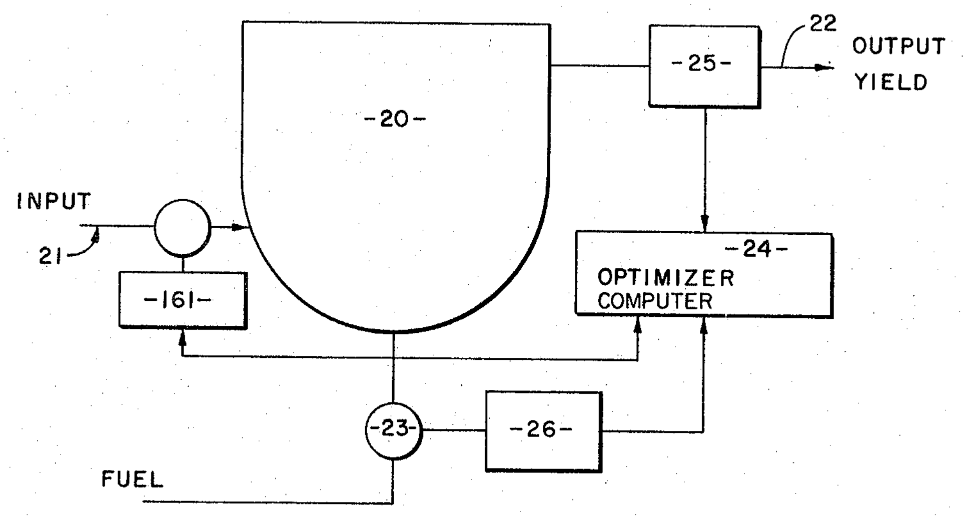
FIG. 2 is a diagram of an illustrative system utilizing the present invention.
Figure 3:
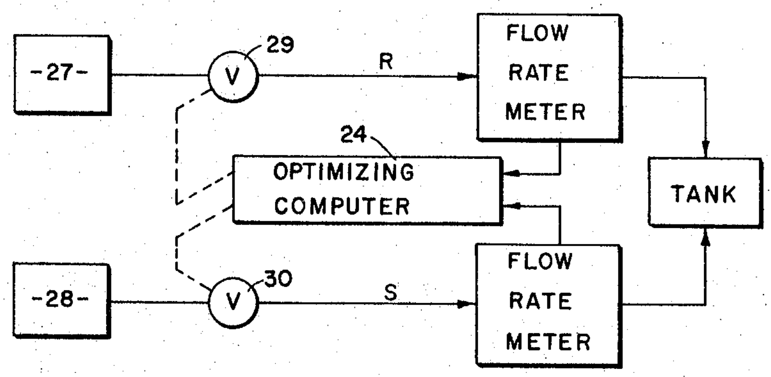
FIG. 3 is a diagram of another illustrative system utilizing the present invention.

The curves of FIG 1 illustrate the operation of the computer of the present invention. Assuming a process is initially represented by the curve A, the computer of the present invention follows curve A along the path $f_1$–$f_2$–$f_3$ until the optimum point $f_m$ is reached. Assuming that at some later time, the particular process is no longer represented by curve A, but is now represented by curve B because of some change in system efficiency, the computer will follow the trend of the change to curve B and locate the new optimum output-to-input ratio. Appropriate corrective action will be taken until the new optimum is found regardless of whether the optimum point $f_m$ for curve B coincides with point $f_m$ for curve A. Two examples of processes for which the optimizing computer is particularly suitable, are shown in FIGS. 2 and 3. In FIG. 2, a vessel 20 has a material input 21, considered a constant for this discussion and product output or yield 22. Heat is applied to the vessel 20 in response to the position of a fuel control valve 23 and some yield quantity is obtained at the output 22. As more heat is applied to the vessel, i.e. as the fuel valve 23 is opened, the product output yield increased from $f_1$ to $f_3$ in FIG. 1 (where fuel flow or valve position, i.e. heat input, is the abscissa and yield the ordinate) until some reaction phase occurs which causes the yield to decrease. The optimizing computer of the present invention 24 optimizes the yield as a function of the fuel flow or heat applied. The computer 24 calculates the instantaneous differential of yield with respect to fuel input both in sense and magnitude to make a logical decision as to which direction to adjust the process for an optimum. This instantaneous differential of yield is calculated in response to a signal generated by transducer 25 which is directly proportional to the yield at 22. The valve position, i.e. heat input is measured by transducer 26, and a signal directly proportional to fuel flow or heat is generated. As soon as the computer of the preferred embodiment had adjusted the process for optimum operation, it stops controlling and monitors the ratio between the two variables in arbitrary units, as is described in detail hereinafter. If this ratio deviates more than a preselected amount, the computer will again compute and seek a new optimum operating point.

Another system utilizing the present invention is shown in FIG. 3, where a process requires the blending of two fluids in a predetermined ratio. In this process, for example, R barrels of fluid from tank 27 are to be mixed with S barrels of fluid from tank 28, R and S are known quantities; and the flow rates are to be optimized keeping the ratio of R and S constant. The computer 24 keeps this ratio constant by controlling valves 29 and 30 in a manner which allows the pipe with the lower flow capacity to run at full flow and by adjusting the other valve to maintain the proper ratio. The computer 24 will also adjust the flows for any desired changes in the R or S flow rates and also compensates for changes in line pressure drops resulting from changes in pressure and/or flow characteristics of the line.

These examples, illustrating applications of the present invention may be multiplied to show numerous uses of the optimizing computer of the present invention for finding the maximum of a function defined by two or more variables, or a minimum, or the point on the knee of a curve having no maximum or minimum, such as point $f_1$ on curve D, i.e. the point where for increases in input, the corresponding change in output is small compared to a predetermined amount.

Other functional relationships, such as that shown as curve C of FIG. 1, may represent the controlled system and the optimal controller of the present invention would then adjust the variables to attain a minimum point on curve C.

Figure 4:
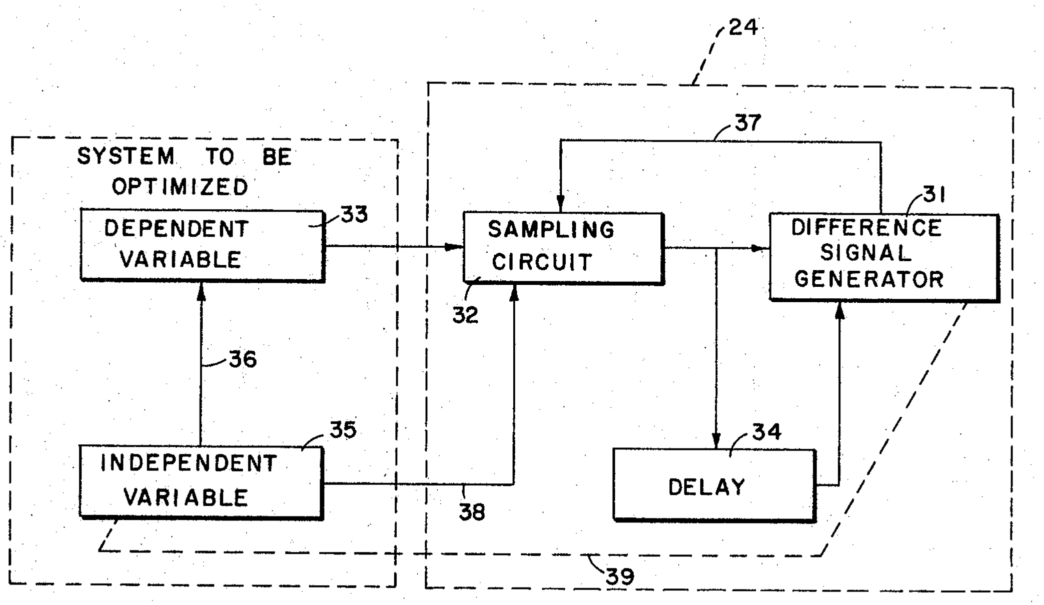
FIG. 4 is a general diagram of one embodiment of the present invention.

The present invention is shown generally in the diagram of FIG. 4, in which the independent variable in a system is varied in accordance with the output of the different signal generator 31, until the function to be optimized reaches the maximum or minimum value represented herein as $f_m$.

In particular, FIG. 4 shows a sampling circuit 32 which receives a signal directly proportional to the dependent variable 33, e.g., yield, as measured by any standard flow transducer in the system to be optimized. The output derived through sampling circuit 32 is applied simultaneously to a delay device 34 and to a difference signal generator 31. Difference signal generator 31 serves to develop a signal which increases or decreases the independent variable 35, which in turn affects variable 33 through the functional response 36 representing the relationship of the independent and dependent variable within the process systems. Each successive sample of the control or dependent variable 33 is compared to a previous sample which had been delayed by device 34 to determine whether the independent variable 35 should be increased or decreased. When the difference is smaller than a predetermined amount, a signal is sent over lead 37 to sampling circuit 32 to compare the ratio of dependent variable signal at 38, and the independent variable signal from 33. So long as this ratio does not appreciably change, the servo connection 39 to the independent variable is not energized and no change is made at 35, and no change is effected in the control variable 33.

It is apparent from the system of FIG. 4 that no continuous hunting for the optimum point will take place in the present invention, since a feedback signal is generated on lead 37 by difference signal generator 31 when the optimum has been reached, i.e. when there is a small difference count. The circuit 24 then monitors the signal from the dependent and independent variables directly and computes a ratio. So long as this ratio is essentially the same, no change is made in the independent variable.

The preferred embodiment of the computer 24 (see FIG. 4) of the present invention, which utilizes standard components well known in the art, is shown diagrammatically in FIGS. *5a* and *5b* and is described herein for purposes of illustration as applied to an electrical system of a variable oscillator 61 with an inductor 62 and capacitor 63 in series. The voltage $v$ at 64 across the capacitor 63, is the dependent variable 33 and the frequency of the oscillator 61 is the independent variable 35. This voltage is rectified by diode 65 smoothed by circuit 66, amplified to a suitable voltage level by amplifier 67, generating an input signal at 68. The components 61–67 do not form a part of the present invention and are utilized herein for the purposes of illustrating dependent and independent variables and the functional relationship of these variables. In this manner, a relationship exists between the dependent and independent variable which relationship is similar to curves A and B of FIG. 1.

In this electrical simulation of the physical process of FIG. 2, the frequency may be considered to represent the independent variable fuel flow at valve 23, i.e. position of valve 23 or heat input. Thus, the frequency of oscillator 61 is a signal which simulates the signal output of transducer 26. The amplitude of the oscillator is constant thus the amplitude of the wave output of source 61 may be considered to represent the input 21 of FIG. 2. The voltage at 68 is proportional to the dependent variable voltage at 64 and may be considered to be the signal generated by transducer 25 representing output yield. The relationship between the frequency source 61 and the inductive-capacitive load 62–63 represents the functional relationship 36 between the two variables within the process taking place within the vessel 20.

Thus, in the application of the present invention to a process such as FIG. 2, the signal at 68 would come from transducer 25 (FIG. 2) and the signal from 61 would come from the valve transducer 26 measuring the fuel flow rate or heat input. The transducers may be of any type well known in the art. The preferred embodiment of the present invention merely requires an electrical signal proportional to a dependent variable and for the monitoring mode an electrical signal proportional to an independent variable.

The converter 69 shown in detail in FIG. 6 comprises a bistable 70, integrator 71 and emitter followers (saturated) 72. Three inputs are provided, 68, 74 and 75 and represent the variables X, Z, and Y, respectively. The output at 76 is a function $$F=\frac{-XY}{kX}$$

where the constant $k$ has a predetermined value as explained hereinafter in detail.

The operation of the circuit of FIG. 6 is as follows: Assuming that X, Y, and Z are each equal from 0 to 10 volts, the bistable circuit 70 switches from +8 to −12 volts when the input level approaches approximately +5.6 volts from a more positive level. As the voltage level becomes more positive, a level of about +8.2 volts returns the output of the bistable 70 from −12 to +8 volts. The inputs 68 (X) and 75 (Y) are two negative D.C. signals ranging, for example, from 0 to 10 volts, while the input 74 (X) is a positive signal. A constant $k$ is introduced by resistances 77 or 78 in series with the input 74 (X) and the resistor *77a*. The integrator 71 has two inputs 74 (X) which is always positive and 79 from the emitter of the X transistor 80. The input 79 is either equal to Z (a negative voltage) or zero depending upon whether 80 is conducting or cut off. The output 81 of the integrator 71 is a positive or negative going ramp voltage that is a function of the sum of the input voltages and respective time constants of the integrator.

If the algebraic sum of the inputs changes sign, the output ramp will reverse direction. The output ramp of the integrator 71 is directly coupled to the level triggered bistable circuit 70 comprising transistors 83 and 84. The output 85 of the bistable 70 is taken from the collector of 84. The voltage level at this point is about +8 volts as long as the input at 81 is about 5.6 volts or larger. When the input signal at 81 reaches a value of +5.6 volts from a more positive value, the bistable output 85 switches from +8 volts to about −12 volts. When the input amplitude reaches a value of +8.2 volts from a less positive value the bistable switches back from −12 volts to +8 volts.

The output 85 of the bistable 70 is coupled through two resistors to the bases of transistors 80 and 86. A positive voltage on the bases of 80 and 86 cuts off the transistors. The emitter signal from 80 and 86 is now zero. Negative voltages on the bases of 80 and 86 allow the transistors to conduct and the voltages on the emitters of 80 and 86 would then equal X and Y, respectively. Assuming the output of integrator 71 changing from 5.6 to 8.2 volts is designated slope A and the change from 8.2 to 5.6 volts is designated slope B, it is apparent that an increase in Z causes no change in the magnitude of slope A. However, the magnitude of slope B increases because the input 79 to the integrator 71 is decreased during the conducting time of 80. Decreasing Z causes no change in slope A, but slope B now becomes smaller in magnitude. An increase in X increases slope A slightly and decreases slope B to a larger extent. Decreasing X has the opposite effect. The increase in Z makes the net input voltage to the integrator 71 more positive. The increase in net input voltage is weighted by the resistances 77 or 78 with 77*a*. The constant $k$ in the equation for the function F is proportional to resistances 77*a* and 77 or 78. This is the reason for the changes in both slope A and slope B. The integrator 71 is inverting, that is, a positive input voltage gives a negative output slope, so that an increase in the positive input signal will make the output ramp steeper.

Thus, X (74) controls the width of the output pulse from 84 and also the pulse width at the output of 80 and 86, while X (68) affects the pulse repetition rate. Since 80 and 86 are being driven in parallel, the pulse output amplitude of the emitter of 86 is directly proportional to Y (75). This point is the output 76 of the converter 69.

Figure 5B:
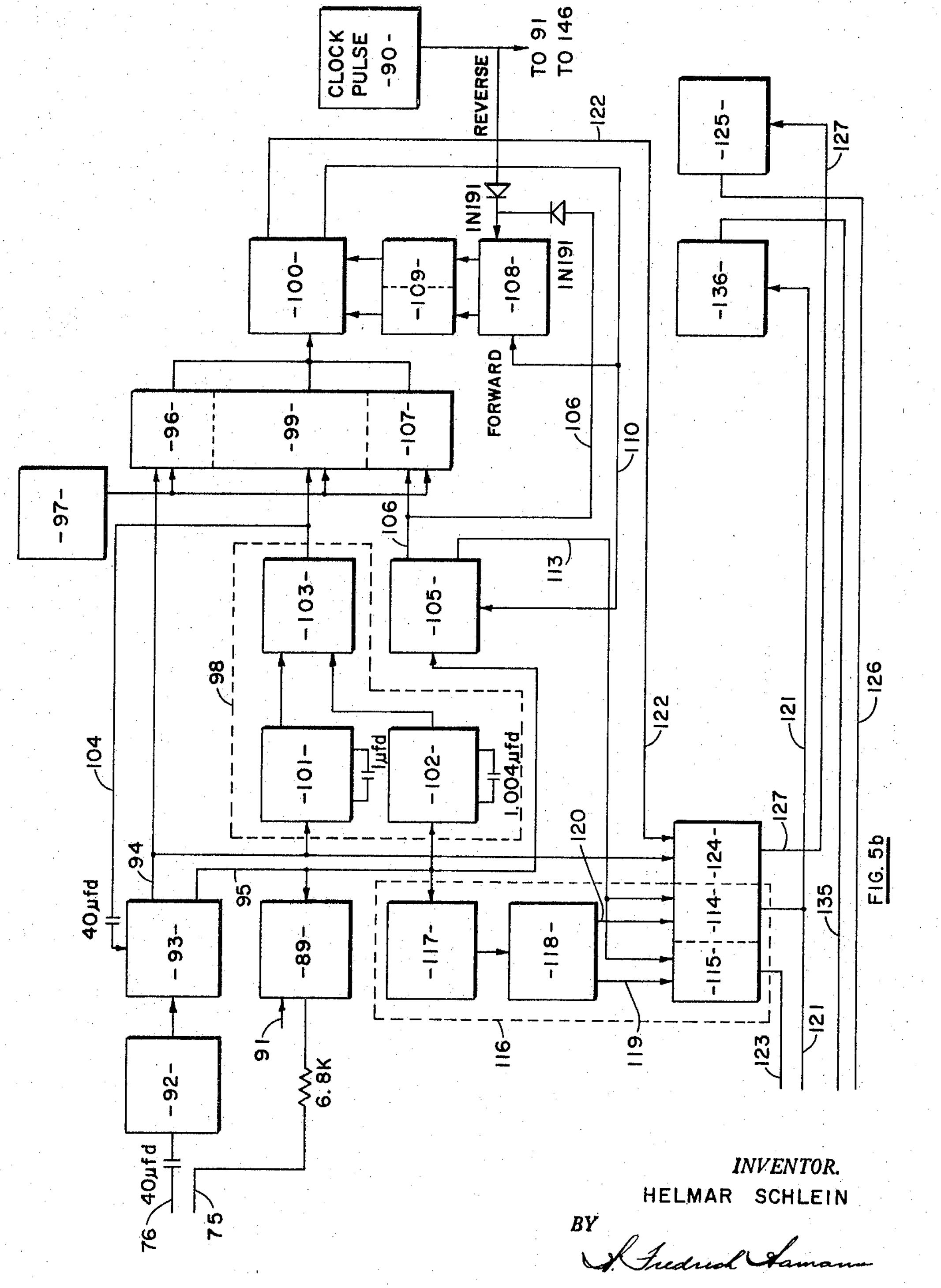

The voltage on input 75 controls the amplitude of the output pulse of converter 69 and 76. The signal at 75 is the output of flip-flop 89. (See FIG. 5*b*.) The flip-flop 89, in response to a pulse from clock 90 through lead 91, controls the output of controller 69 by increasing the amplitude of the pulses at 76 for a predetermined time as shown in FIG. 7*c*. The trigger 92 in response to the increased pulse height generates an output (FIG. 7*b*) which energized flip-flop 93, so that an output signal referred to herein as the undelayed count (see FIG. 7*d*) is generated at lead 94. The output at 95 is a complement of the output at 94. The undelayed count signal is connected to gate 96 which is also connected to fixed-frequency pulse generator 97, having a frequency output of approximately 100 kc., for example. The output of the gate 96 is a series of pulses, the number of which is proportional to the time duration of pulses out of 92, which in turn is inversely proportional to voltage at the input 68 of the converter 69 in the preferred embodiment.

The output at 94 is also connected to the delay circuit 98 which merely delays the voltage shifts a predetermined time before feeding it to gate 99. The gate 99 is also connected to the fixed frequency source 97. The outputs of gates 96 and 99 are connected to the forward-backward register 100 of well known design. The delay 98 comprises one-shot circuits 101 and 102 connected to complementing outputs 94 and 95 of circuit 93, respectively, and generate output signals as shown in FIGS. 7*f* and *g*, respectively. These voltage level shifts are triggered by the positive going pulse segments of the outputs at 94 and 95, respectively. The voltage level shift at the output of 102 is preferrably about 20 microseconds longer than that of circuit 101, so that the delayed count voltage level shift fed to mixer 99 through flip-flop 103 is longer than the undelayed count by a time equal to about 2 or 3 pulses. This is done in the preferred embodiment because a register having a finite capacity is used. Thus, a count of zero in the register 100 may be interpreted as zero or the maximum register count, i.e. 1024 for the 10 stage binary register of the preferred embodiment and such a count would not be unique.

These two voltage level shifts are fed to flip-flop 103 which generates an output as shown in FIG. 7*h*, the initiation and termination of which are governed by the positive going portions of the voltage level changes in the outputs of 101 and 102. The output of 103 is delayed over the output at 94 by a time sufficient to allow any pulse width anticipated by the particular process being optimized to be counted by register 100. The output of 103 is fed to mixer 99 as noted above and through lead 104 to set flip-flop 93, so that the next signal from trigger 92 will energize 93 to generate an undelayed-count-voltage-shift.

The signal at 95 is also fed to flip-flop 105 which in response to the positive going trailing edge of the signal on 95, i.e. a change from about −12 to about −1 v. in the preferred embodiment, generates a positive voltage level shift on lead 106 which opens gate 107, so that pulses are fed to the register 100. The signal on 106 is also connected to the reverse mode of the forward/backward control 108 which upon the initial voltage shift energizes counter 100 through emitter followers 109, so that any incoming pulses to counter 100 will be counted in the backward direction. Assuming that a previous point $f_1$ on the curve of FIG. 1, has resulted in the register recording 110 delayed counts, and that the second undelayed count has counted 20 in the reverse direction, the gate 107 is opened so that a 90 difference count is counted backward and the counter reaches zero. The difference count is terminated when the register 100 reaches zero and generates a signal, the signal connected through lead 110 to circuit 105 changes the output of flip-flop 105 thus closing gate 107. The difference count takes place during the voltage level shift shown in FIG. 7*i* and is the difference between the previously registered delayed count (counted up) representing point $f_1$ and the undelayed count (counted down) representing point $f_2$.

Since the difference count between point $f_1$ and $f_2$ is more than some predetermined minimum, i.e. 5 counts, for example, the circuit of the present invention should continue to compute to determine an optimum operating condition. This is accomplished by utilizing controller 116 which includes gate circuits 114 and 115. The controller 116 receives at trigger 117 a signal from lead 95 and generates a voltage shift of 50 micro-seconds duration (FIGS. 7*k* and *l*) through pulse shaping circuit 118 which is fed to gates 114 and 115, respectively through leads 119 and 120. Circuit 105 is connected by lead 113 to gates 114 and 115. The output signal of lead 113 is the complement of the signal on lead 106 and has a trailing edge which is a fast, positive going voltage shift. Independent gates 114 and 115 are activated by this voltage shift only if the control voltage on leads 119 and 120 is of proper magnitude. So long as the difference count is larger than 5 counts, only "compute" lead 121 will be energized. This is accomplished by having gate 115 open while the voltage lead on 119 is less negative and gate 114 is open, while the voltage on lead 120 is less negative. In this manner, if the positive going voltage shift on lead 113 takes place during the duration of the pulse on 119, gate 115 will pass the signal. If this signal takes place during any other time, gate 114 (compute) will pass the signal as is apparent in more detail in FIG. 8. Thus, where the difference count is large, FIG. 8*a*, the positive going voltage shift on lead 113 will occur, while gate 115 is closed and gate 114 is open; therefore, an output signal will be gated to lead 121. In this case, the voltage shift on lead 113 does not take place while gate 115 is open so no monitor signal is gated to lead 123.

In the case of a non-optimum condition, the signal on output 121 is utilized as a continue-to-compute signal as explained in detail hereinafter.

If it is assumed that several computing operations as described above have proceeded and that the optimum operating point $f_m$ is being approached, the system functions as follows. Assuming the register 100 has counted up the delayed counts from the previous operating point $f_3$, and that number of counts recorded at 100 is 25. The undelayed count for point $f_m$ is 23, and is counted down from 25 leaving a small difference as in the case of FIG. 9. However, since the register has not passed through zero, no signal is generated on leads 110 and 122 and the register is left in a backward counting condition since controller 108 has not been energized. The difference count is then made, FIG. 9*i*, and the register goes to zero. A signal is generated on leads 110 and 122 in response to the register going to zero, and a voltage shift takes place on lead 113. The voltage shift takes place during the 50 micro-second pulse generated on lead 119, i.e. the difference count is less than a predetermined minimum, five in this illustration. Since there is coincidence between the pulse on lead 119 and the voltage shift on lead 113, gate 115 will be opened. The voltage shift is applied to both gates 114 and 115, but only gate 115 is open, and therefore, a signal is passed to lead 123.

If the second count had been 27, i.e. the difference is small but the register passes through zero before the start of a difference count, the controller 108 energized through lead 110 changes register 100 so that subsequent counts will be counted in the forward direction. The signal at 113 is again coincident with the pulse on 119, and the gate 115 is open so that a signal is generated on monitor lead 123. Since the signal at 113 is applied to gate 114, while the gate is closed, i.e. during the duration of the pulse on lead 120, no computer signal is applied to lead 121.

In this manner, a small difference count, whether the register has passed through zero or not, results in a monitor signal on lead 123. This is shown in FIG. 8, where FIG. 8*a* is the output signal or difference signal at 113 for large difference counts and FIG. 8*d* is the ouput signal at 113 for small difference counts.

Referring again to FIG. 5*b*, the voltage level change at 95 is connected to flip-flop 89, which in response to clock pulse at 91 changes the voltage level on lead 75 from −3 v. to −12 v. The lead 75 which controls the amplitude of the output of the controller 69, as explained above, remains at this new voltage level until the positive going trailing portion of the signal on 95 changes the voltage output of circuit 89 back to −3 v., a magnitude insufficient to trigger circuit 92. The time interval between output pulses from clock 90 is selected in accordance with the time response of the dependent variable of the system being controlled to incremental changes in the independent variable, i.e. the slower the response time the longer the time interval between successive output pulses from timing clock 90.

If the process is moving away from the optimum point along the right hand side of curve A of FIG. 1, i.e., through operating points $f_n$ and $f_o$, the present invention functions in the following manner to reverse the direction of movement of the operating point. The signals at 76, 75, 92, 94, 95, 101, 102 and 121 are the same as shown in FIGS. 7 (see FIG. 10). If it is assumed that the register has received the previous delayed count, e.g., 100 for a point $f_n$, and that the undelayed count for point $f_o$ is now being fed to register 100, it is apparent that the count for operating point $f_o$ will be greater than that of $f_n$ and that the register will now receive an undelayed count which is greater than 100, e.g., 150. The undelayed count representing operating point $f_o$ is being registered, the register 100 will pass through zero causing level shifts on lead 110 and on lead 122. These same shifts were generated on lead 110 and 122 in the case shown in FIG. 7. However, only in the case where the operating point is moving away from the optimum are these pulses generated during the time the undelayed count is being fed to the register 100 (see FIG. 10*i*). This coincidence is utilized in the present invention to reverse the direction of the operating point movement by reversing the direction of movement of the independent variable. The positive shift on lead 122 is the signal for coincidence gate 124, and the signal on 94 is the control for gate 124. When the signal on 122 is present while control voltage on 94 is more positive an output pulse (see FIG. 10*j*) appears on lead 127 connected to flip-flop 125. The output of 125 (see FIG. 10*k*) is now a constant voltage, which is fed through lead 126 to dual relay driver 129, which energizes solenoid 130 moving double pole double throw switch 131 from one position to another so that the voltage source circuit 132 may now be connected across the servo 133 to reverse the direction of servo movement in response to the position of switch 134. The servo 133 which is mechanically connected to the frequency source 61 will reverse the direction of movement of the frequency source 61, i.e. to a reduced frequency, so that the operating point $f_m$, instead of away from it as is the case for increasing frequency. Thus switch 131 is moved only when a zero crossing of the register occurs during the undelayed pulse duration. The switch 134 is controlled through one-half of the dual relay driver 129 by the signal on lead 135. The signal on lead 135 is controlled by one-shot circuit 136 in response to the signal on lead 121. Thus, the output of gate 114 actuates circuit 136 which in turn de-energizes relay 134 momentarily so that a circuit is completed between voltage circuit 132 and servo 133. Thus, the servo is actuated in a direction determined by the presence or absence of a signal from gate 124. The signals on outputs 121 and 123 are shown in FIGS. 11(*i*) and (*h*), respectively.

The signal on 121 is connected to a flip-flop 137, which generates no signal on lead 138 unless the next preceding pulse on 137 was received over lead 123, i.e. a change from a monitor condition to a compute condition is required. Considering FIGS. 11(*h*) and (*i*), it should be noted that after the first monitor pulse is impressed on lead 123 that the next pulse 139 will always be a compute pulse because the register has not been cleared of the previous delayed count and the difference will be counted as large although no change in the operation of the system being optimized has taken place. Therefore, provision is made for ignoring the first compute signal on 121 after a monitor pulse on 123. In this manner, the register is then cleared and only the small difference is recorded. The system will then continue to monitor until the ratio of the dependent variable and independent variable indicates, that some event has happened to require resumption of the compute mode. This is accomplished by generating a voltage shift at 138 in response to the first compute pulse after a monitor pulse, or the first monitor pulse after a compute pulse, as indicated in FIG. 11*c*. The outputs 140 and 141 of the bistable 142 are connected to switching circuits 143 and 144 so that these circuits are opened or closed as noted in FIG. 11(*d*) and (*e*). It is apparent that the pulse 139, see FIG. 11(*i*), on output 121 would result in switching of the circuits 143 and 144 at undesirable times, unless this pulse was blocked from activating flip-flop 142. This blocking is accomplished by utilizing a flip-flop 145, receiving inputs from clock pulses at 146, FIG. 11(*a*), and signals from output 138. Circuit 147 is sensitive to a positive voltage shift on 138 only if a previous clock pulse has caused 145 to generate a voltage of −1 volt on lead 148. Circuit 147 is responsive to a positive going pulse from circuit 145 to change the voltage on lead 149 from −1 to −10 volts. The diode 150 clamps the circuit 142 to −10 volts so that any signal received by circuit 142 through lead 138 in response to pulse 139 is ignored and no change in the output of 142 takes place. Thus, output signals on lead 140 and 141 are generated only when a true change from compute to monitor is required. No spurious pulse 139 results when there is a change from monitor to compute mode. The switch 144, which is closed during he compute mode of operation, connects the D.C. signal at 68 to input lead 74 with appropriate amplification and inversion.

Lead 153 connects the signal representing the value of the independent variable 61 to squaring circuit 154 which converts the sine wave of 61 to square wave output at 155.

The one-shot delay circuit 156 which has a constant width proportional to capacitor 158, generates an output pulse on lead 157 connected to switch 143. The signal on lead 157 has a repetition rate which is proportional to the frequency of source 61. The circuits 154 and 156 are transducers in this embodiment and do not form a part of the optimizer when applied to a process system. The signal on lead 157 is connected through switch 143 only during the monitor mode of operation to an amplifier 159, whose output is proportional to the average of the input.

Thus, the output of amplifying circuit 159 is a D.C. voltage proportional to the frequency of 61, i.e. the independent variable during the monitoring mode. During this mode of operation, switch circuit 143 is closed and switch 144 is open. In this manner, the converter 69 receives a signal at 68 proportional to the dependent variable *v*, and a signal at 74 proportional to the independent variable frequency. The converter 69 now computes the ratio of the voltages on leads 68 and 74. The output 76 is the function $$f=\frac{-XY}{Xk}$$

during the compute mode of operation. The pulse width and repetition rate are then both proportional to the voltage at 68. However, under monitoring conditions the function $f$ is equal to $$\frac{-XY}{Zk}$$

and the repetition rate of the signal at 76 is a function of both the dependent and independent variable. Thus, output 76 of converter 69 is similar to FIG. 10(*b*), but with different pulse width and repetition rate dependent upon the computed ratio.

The remainder of the circuit shown in FIG. 5(*b*) operates in the same manner as described above except a small difference count will be obtained and registered at 100 and a monitor pulse will be generated at 123, so long as the difference count representing the succeeding ratio computations is smaller than a predetermined amount, i.e. 5 counts. In this manner, the present invention monitors the ratio of the dependent and independent variable and so long as this ratio is essentially constant no change is made in the value of the independent variable. Thus, under the monitoring mode there will be no signal at 121 and switch 134 will not be moved to connect the voltage circuit 132 to the servo 133. The independent variable 61 will remain in the computed optimum position until the ratio is determined to have changed more than the predetermined amount. If because of a change in the process system the ratio changes, the difference count will again become large and a compute mode of operation will be initiated to determine the new optimum operating point.

In this manner, the disadvantage of continuously hunting for the optimum is eliminated and the independent variable is maintained at the optimum value until the monitoring operation of the ratio of the variables determines that a change in the independent variable is required because the difference count has become larger than a preselected number.

Although particular embodiments of the present invention has been described, various modifications will be apparent to those skilled in the art. Therefore, the present invention is not limited to the specific embodiments described, but only by the appended claims.

What is claimed is:

1. Apparatus for controlling a system having an optimum point of operation comprising a first input signal representing the value of a dependent variable, and another input signal representing the value of an independent variable of the system to be controlled; first means responsive to said first input signal for periodically generating a group of pulses proportional to the value of said dependent variable; second means connected to said first means for comparing successive periodic pulse groups and providing a difference signal proportional in sense and magnitude to the difference between two successive pulse groups; third means responsive to said difference signal for selectively changing the value of said independent variable value, said third means including fourth means connected to said second means and responsive to a predetermined difference output signal for generating a monitor signal, fifth means responsive to said monitor signal for connecting said other input signal to said first means and energizing said first means in such a manner that said group of pulses is proportional to a ratio between said first input signal and said other input signal, said fourth means being responsive to a difference signal greater than said predetermined difference signal to generate a compute signal and disconnect said other input signal from said first means.

2. An optimal control computer comprising a first input signal representing the value of a dependent variable and a second input signal representing the value of an independent variable of a system to be controlled; first means responsive to said first input signal for providing first signals with a predetermined repetition rate and amplitude and having a duration inversely proportional to said first input signal; second means connected to said first means for comparing successive periodic first signals and for providing a difference signal proportional in sense and magnitude to the difference between successive first signals; third means responsive to a predetermined large difference signal for selectively changing said independent variable value, said third means including fourth means connected to said second means and responsive to a predetermined small difference signal for generating a monitor signal, fifth means responsive to said monitor signal for connecting said second input signal to said first means, said second input signal controlling said predetermined pulse repetition rate of said first signal in inverse proportion to the value of said second input signal, said first signals being proportional to the ratio of said first and second input signals when said dependent variable is optimized with respect to said independent variable, said fourth means being responsive to a large difference signal to generate a compute signal and disconnect said second input signal from said first means.

3. Means for controlling the operation of a system represented by a plurality of independent and dependent variables comprising first means for generating a plurality of input signals, one input signal being proportional to the value of a dependent variable of said controlled system; second means for generating a second signal inversely proportional to said one input signal; third means responsive to said second means for periodically generating a first group of pulses proportional to said second signal; fourth means connected to said second means for delaying said second signal and generating a second group of pulses; means responsive to said first and second group of pulses for generating an output signal proportional in sense and magnitude to the difference between sequential groups of pulses; and means responsive to a predetermined output signal for changing the value of one of said independent variables.

4. An optimizer responsive to input signals, each representing the value of one of a plurality of dependent and independent variable parameters of the operating condition of a system to be optimized comprising first means responsive to one of said dependent signals for generating a first group of pulses inversely proportional to said one signal; second means connected to said first means for generating a second group of pulses delayed in time and differing by a constant number of pulses from said first group; difference signal generating means responsive to said first group and said delayed group of pulses for generating an output signal proportional to the algebraic difference between one group of pulses and the previous group of pulses; means responsive to predetermined large difference signals for changing the value of an independent variable parameter; and means responsive to predetermined small difference signals for generating a group of pulses proportional to the ratio between said dependent and independent variables; said last-named means including said first means.

5. An optimizer responsive to input signals, each representing the value of one of a plurality of dependent and independent variable parameters of the operating condition of a system to be optimized comprising first means for periodically generating a number of pulses proportional to the value of an input signal representing a dependent variable; second means connected to said first means for storing said number of pulses; third means connected to said generating means and said storage means for counting said pulses in each of two consecutive series of pulses and obtaining an output signal proportional to their algebraic difference; fourth means responsive to the sense and magnitude of said output signal for changing the value of an independent variable; and a fifth means responsive to an algebraic difference smaller than a predetermined amount for generating a signal proportional to the ratio between said dependent variable input signal and independent variable input signal and monitoring said ratio; said fifth means including said first, second and third means during said monitoring.

6. An optimizer responsive to input signals, each representing the value of one of a plurality of dependent and independent variable parameters of the operating condition of a system to be optimized comprising means connected to at least one of said input signals for generating a pulse having a repetition time inversely proportional to said input signal representing said dependent variable; means for generating a number of pulses proportional to said time; means for generating a number of delayed pulses proportional to said time; means responsive to said number of pulses and said delayed pulses for generating an output signal proportional in sense and magnitude to the difference between said number and said delayed number; and means responsive to said output signal for controlling the value of an independent variable.

7. An optimal controller for a system having an optimum operating region represented by input signal representing at least one dependent variable and one independent variable comprising means responsive to said dependent variable input signal for periodically generating a signal having a time duration inversely proportional to said input signal; means responsive to said periodic signal for generating a number of first pulses proportional to said time; means including a register responsive to said first number of pulses for counting from a previously registered number to obtain a difference count; said register means generating an output signal when it reaches zero, and means responsive to a preselected register output signal to stop said difference count; means for generating a delayed number of first pulses and feeding then to said register after said difference count; said previously registered number being the number of pulses counted in the preceding delayed pulse series; means for generating a second output signal responsive to the sense and magnitude of said difference; and means responsive to a predetermined large second output signal for changing the value of said independent variable.

8. The optimal controller of claim 7 including monitoring means responsive to a predetermined small output signal for generating a signal having a time duration proportional to the ratio between said dependent variable input signal and the independent variable input signal, said monitoring means including said first-named means.

9. The optimal controller of claim 7 including monitoring means responsive to a predetermined small output signal for generating a signal having a time duration proportional to the ratio between said dependent and independent variable input signal, said monitoring means including switching means selectively connecting said dependent variable input signal to said first named means in response to a predetermined large output signal and said independent variable input signal to said first named means in response to a predetermined small output signal.

10. The optimal controller of claim 9 wherein said means for changing the value of said independent variable includes a pair of gates, a controller connected to said gates for controlling the passage of signals through said gates, one of said gates being responsive to a predetermined large output signal for passing said output signal to compute lead, the other of said gates being responsive to a predetermined small output signal for passing said output signal to a monitor lead, and servo means responsive to said signal on said compute lead to change the value of said independent variable.

11. The optimal controller of claim 10 including means responsive to a signal on said monitor lead to connect said independent variable input signal to said first named means, said first named means in response to said connection periodically generating a signal having a time duration inversely proportional to the ratio of said two input signals.

12. An optimal controller for a system having an optimum operating region represented by a dependent and an independent variable comprising measuring means measuring the value of each of said variables; first means responsive to a timed pulse and connected to said measuring means for periodically generating a pulse having a time duration inversely proportional to one measured value representing said dependent variable; a second means responsive to said periodic pulses for generating a first group of pulses proportional to said time duration; third means responsive to said periodic pulse for generating a group of delayed pulses, register means responsive to said first group of pulses for counting from a previously registered number to obtain a difference count, said register means counting said delayed pulses after said difference count has been obtained, said previously registered number being the number of pulses counted in the preceding delayed pulse group; fourth means for generating an output signal responsive to the sense and magnitude of said difference count; fifth means responsive to the end of said difference count, a zero crossing of said register and a timed pulse to control the register operation; sixth means responsive to a predetermined large output signal for changing said independent variable; seventh means responsive to a predetermined small difference count for generating a monitor signal; eighth means responsive to said monitor signal for connecting said measuring device of said other variable to said first means and energizing said first means so that said periodic pulse is proportional to a ratio between the values of said two variables, said seventh means being responsive to a large difference count to generate a compute signal, said eighth means being responsive to a predetermined compute signal to disconnect said independent variable measuring device from said first means.

13. The optimal controller of claim 12 including means connected between said seventh means and said eighth means for blocking the first compute signal generated after a first mointor signal.

References Cited by the Examiner

UNITED STATES PATENTS

| | | | |
|---|---|---|---|
| 2,972,446 | 2/1961 | White. | |
| 3,075,700 | 1/1963 | Bishop | 235—151 |
| 3,149,270 | 9/1964 | Smyth et al. | |
| 3,151,237 | 9/1964 | Hrabak. | |
| 3,181,791 | 5/1965 | Axelrod | 235—151 X |

MALCOLM A. MORRISON, *Primary Examiner.*

I. KESCHNER, *Assistant Examiner.*